July 28, 1959 M. H. MESNER 2,897,263

COLOR REPRODUCTION USING BRIGHTNESS SIGNAL ALONE AS SUBSTITUTE FOR GREEN SIGNAL

Filed Jan. 24, 1956

INVENTOR.
Max H. Mesner

BY

[signature]

ATTORNEY

United States Patent Office 2,897,263

Patented July 28, 1959

2,897,263

COLOR REPRODUCTION USING BRIGHTNESS SIGNAL ALONE AS SUBSTITUTE FOR GREEN SIGNAL

Max Hutchinson Mesner, Princeton, N.J., assignor to Radio Corporation of America, a corporation of Delaware Application January 24, 1956, Serial No. 561,072

8 Claims. (Cl. 178—5.4)

Figures 1, 2:
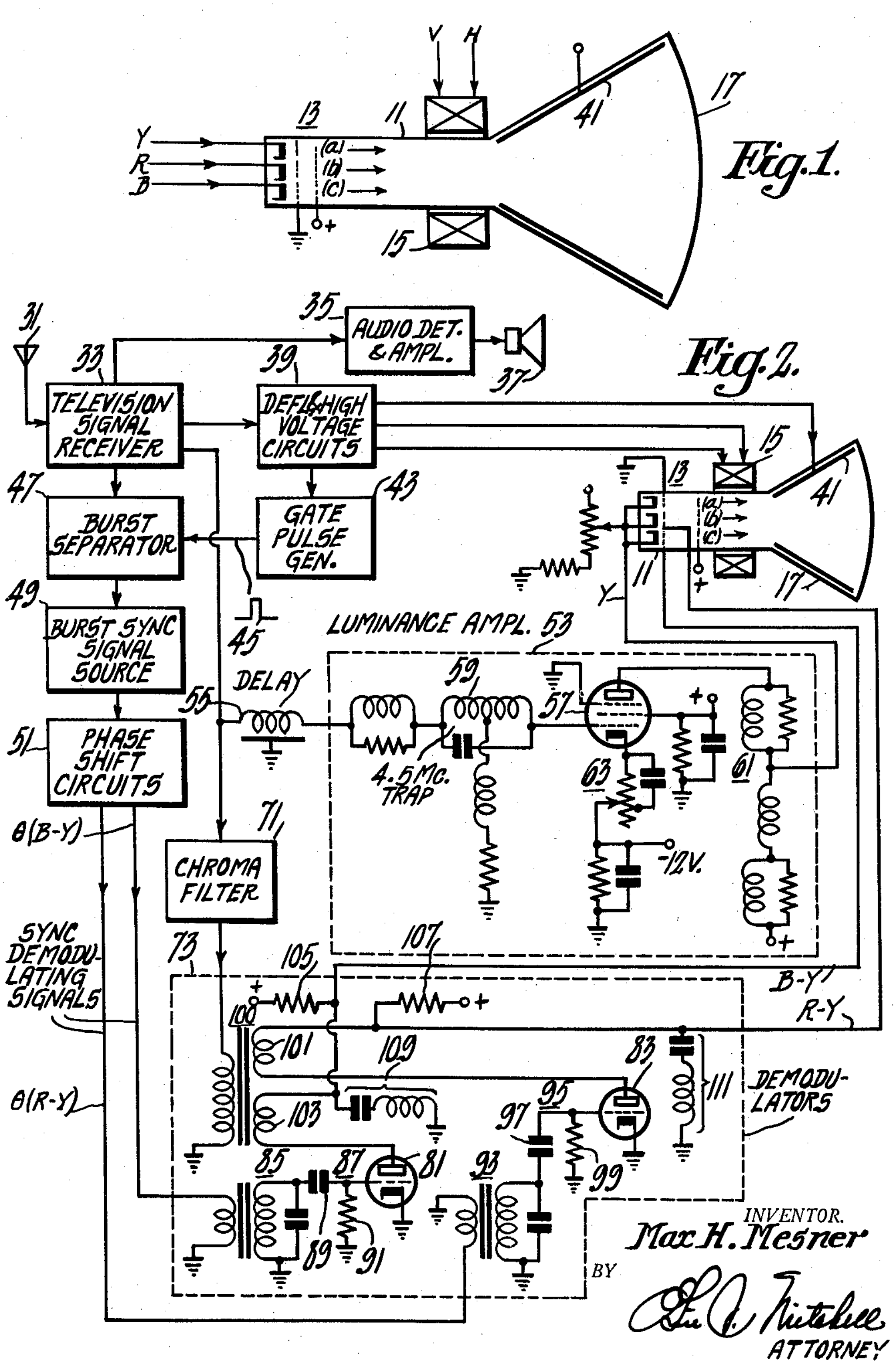

The present invention relates to simplified color television receivers employing a luminance signal and fewer than three color difference signals to form a color television image on a color image reproducer.

In the color television signal which conforms to the standards adopted by the Federal Communications Commission on December 17, 1953, a luminance signal or Y signal is transmitted. The luminance signal is a wide band brightness information signal which contains color information relating to each of three primary colors, namely, green, red and blue, according to the proportions 59%, 30% and 11%, respectively. There is also transmitted in the color television signal a modulated subcarrier or chrominance signal which includes medium or narrow band information relating to color difference signals. Each color difference signal in the chrominance signal is an indication of how that color in the televised scene differs from the color content of the corresponding color in the luminance signal. The luminance signal in combination with the color difference signals of the type G—Y, R—Y and B—Y provide a complete description of the color content of the televised image.

A plurality of color difference signal channels is required in a color television receiver to produce color difference signals which, when combined with the luminance signal, yield the component color signals. If the need for one or more of the color difference signals can be eliminated without undue deterioration of the reproduced image, then the circuitry of the color television receiver may be simplified to the extent of both simplifying the operation of the receiver and reducing the cost of manufacture.

It is an object of the present invention to provide a means to eliminate one color difference signal channel in a color television receiver.

It is a further object of this invention to provide a color television receiver of simplified circuitry.

According to the invention, a color image reproducer capable of producing component color emission at each of a plurality of colors is provided. Luminance signal information or multi-component color information at both low and high frequencies is used to control the color light emission from the color image reproducer at one of the component colors. Other color light emission from the color image reproducer is controlled according to the corresponding color content of the televised image.

In one form of the present invention wherein there is employed a tri-color kinescope capable of producing red, green and blue component images. A luminance or Y signal is used to control the light emission corresponding to the green image, with red and blue component color signals used to control the light emission corresponding to the red and blue images.

Other and incidental objects of this invention will become apparent upon a reading of the following specification and a study of the figures, wherein:

Figure 1 shows a color kinescope driven by color information signals according to the present invention; and Figure 2 is a diagram of a color television receiver providing color information to a color kinescope according to another form of the present invention.

Figure 1 includes a tri-color kinescope 11 having a trio of electron guns 13. The electron guns emit electron beams which, under control of the deflection yokes 15, responsive to vertical and horizontal deflection signals, excite, respectively, red, green and blue light emissive phosphors on the image face 17 to produce a colored image.

One method of operating the color kinescope 11, according to the present invention, is to apply the following typical signals to the electron guns of the trio of electron guns. Let the electron guns which excite the green, red, and blue light emissive phosphors be denoted as *a*, *b*, and *c*, respectively. A luminance signal, or signal comprising a prescribed combination of information related to a plurality of component colors at both lower and higher frequencies is applied to the cathode of the electron gun *a*. The red component color signal constituting the Y signal combined with the R—Y signal is applied to the cathode of the electron gun *b*. The blue signal, which is made up of the Y signal combined with the R—Y color difference signal, is applied to the cathode of the electron gun *c*. The Y, R and B color signals are wide band signals which contain principally luminance or brightness information between substantially 1 mc. and 4 mcs. From approximately 0 to either ½ mc. or 1½ mc., depending upon the color bandwidth of the receiver, the R and B signals will describe principally red and blue color information, respectively, relating to the televised image. In this low frequency range, the luminance or Y signal will contain 59% green signal information. The resulting color image produced on the image face of the color kinescope 11 by electron beams from the trio of electron guns 13 will thereupon be a reproduced image of good fidelity. It is to be noted that only a pair of color difference signals, namely, the R—Y and B—Y color difference signals which are used in conjunction with the Y signal to make up the R and B signals are required. The employing of only two color difference signals rather that three without deterioration of the reproduced color image provides a means of simplifying both the operation and the circuit of the color television receiver.

The operation of the color kinescope 11 of Figure 1 utilizing the Y, R and B signals represents only one possible type of operation following from the teachings of the present invention. This operation is preferable, however, in view of the large proportion of green signal information in the luminance signal.

In general, the color kinescope 11 of Figure 1 or any color image reproducer involving a plurality of component colors can be operated in such a way that a first signal involving color information relating to a plurality of component colors over at least a band of lower frequencies is used to control the light emission at one of the plurality of the component colors of the color image reproducer. Other color information signals related to a single color are thereupon used to control the light emission at corresponding colors from the color image reproducer.

It is to be recognized that the present invention is not limited to usage in a color kinescope or in a color image reproducer which utilizes only three colors. In a two-color image reproducer, a first signal relating to, say a luminance signal or to a signal describing a multiplicity of colors can be used to control the light emission of one of the component colors of the two-color image reproducer; a second signal bearing color information relating to the second color of a two-color image reproducer is thereupon to control light emission at that color from the color image reproducer.

Returning to the color image reproducer 11 of Figure 1, it is to be recognized, therefore, that signals of the type Y, $C_1$ and $C_2$ may be used to control light emission from the color image reproducer 11 at component colors $C_1$, $C_2$ and $C_3$ with the Y signal made up of prescribed proportions of $C_1$, $C_2$ and $C_3$ though not necessarily at the proportions specified by the Federal Communications Commission. The luminance or Y signal for the more general case actually may also be formed from color information relating to component colors other than those used by the color kinescope 11.

Figure 2 is a diagram of a color television receiver which employs one form of the present invention. In the color television receiver of Figure 2, the incoming signal from the broadcast transmitter is received at the antenna 31 and applied to the television signal receiver 33. The television signal receiver 33 demodulates the color television signal from the incoming signal; the television signal receiver employs, for example, circuits to perform the functions of first detection, intermediate frequency amplification and second detection. The output signal of the television receiver is therefore the color television signal which includes not only the luminance and the chrominance signal but also deflecton synchronizing signals, color synchronizing bursts which are transmitted on the "back porch" of each horizontal synchronizing pulse and also a frequency modulated sound carrier which is transmitted 4½ mcs. removed from the picture carrier. The color synchronizing bursts convey reference phase information which is essential for producing locally generated demodulating signals which are employed for demodulating color difference signals from the chrominance signals by synchronous demodulation.

Using, for example, an intercarrier sound circuit, the sound information is demodulated from the color television signal and amplified in the audio detector and amplifier 35. The amplified sound signal is thereupon applied to the loud speaker 37.

The deflection synchronizing signals are separated from the color television signal in the deflection and high voltage circuits 39 wherein horizontal and vertical defletcion signals are developed in addition to a high voltage. The horizontal and vertical deflection signals are applied to the deflection yokes 15; the high voltage is applied to the ultor 41 of the color kinescope 11.

The deflection and high voltage circuits 39 also energize a gate pulse generator 43. The gate pulse generator 43 may be in the form of a multivibrator responsive to horizontal synchronizing pulses or may be a flyback winding on the high voltage transformer of the high voltage circuits. The gate pulse generator produces a gate pulse 45 which has a duration interval at least equal to and in time coincidence with the color synchronizing bursts.

The color television signal and the gate pulses 45 are applied to the burst separator 47. The burst separator is a gate circuit which, responsive to the gate pulses 45, separates the color synchronizing bursts from the color television signal. The separated bursts are thereupon applied to the burst synchronized signal source which develops a substantially continuous signal having a phase and frequency accurately synchronized to that of the burst. The burst synchronized signal source 49 may, for example, consist of a ringing circuit, an injection locked oscillator or an automatic frequency control system utilizing a phase discriminator and a reactance tube to control the phase and frequency of an oscillator. The output signal of the burst synchronized signal source is thereon applied to the phase shift circuits 51 which develop synchronous demodulating signals at typically the phases corresponding to the B–Y and R–Y color difference signals in the chrominance signal; that is, $\theta$ (B—Y) and $\theta$ (R—Y).

The color television signal is applied to the luminance amplifier 53 by way of the delay line 55. The luminance amplifier includes a tube 57. The color television signal is applied from the delay line 55 to the control grid of tube 57 by way of a 4.5 mc. trap 59 which removes sound carrier components from the signal applied to the tube 57. At this point, the color television signal consists principally of luminance signal information since the color television signal is not subjected here to synchronous demodulation. The tube 57 has an output load 61 and a cathode circuit 63 which both develops both a self-bias and a bias from a —12 v. potential source. The frequency characteristics of the output load 61 are such as to permit amplification of the luminance signal over the full bandwidth of the color television signal, preferably to approximately 4.2 mcs. The amplified and delayed luminance signal is thereupon applied from the output load 61 of the luminance amplifier 53 to each of the cathodes of electron guns *a*, *b*, and *c* of the trio of electron guns 13 of the color kinescope 11.

The color television signal is applied to the chroma filter 71 which selects components in a prescribed frequency range from the color television signal. For one type of operation of the color television receiver, the chroma filter will select components in a frequency range from approximately 3 to 4.2 mcs.—the resultant signal being the chrominance signal. In another type of operation the chroma filter may select components in the freqeuncy range from approximately 2 to 4.2 mcs., this wider band chrominance signal being suitable for receivers providing improved color edge reproduction of the reproduced image. The demodulators 73, responsive to the chrominance signal from the chroma filter 71 and the synchronous demodulating signals from the phase shift circuits 51, thereupon develop R—Y and B—Y difference signals.

The control grid of electron gun *a* is *a*—*c* grounded. The R—Y color difference signal is applied to the control grid of electron gun *b;* the B—Y color difference signal is applied to the control grid of the electron gun *c*. Electron gun *a*, which will excite the green phosphors of the color kinescope 11, is thereupon driven by the luminance signal information. Electron gun *b*, which controls light emission from the red phosphors of the color kinescope 11, will combine the luminance signal and the R—Y color difference signal to introduce modulations representative of the red component color information in the electron beam issuing from the electron gun *b*. Electron gun *c*, which control the light output of the blue phosphors of the color kinescope 11, will combine the luminance signal and the blue color difference signal to introduce modulations representative of the blue component color signal into the electron beam issuing from that electron gun. The televised image will thereupon be developed on the image face 17 of the color kinescope 11.

The demodulators 73, which produce, for example, the B—Y and R—Y color difference signals, may use any desired type of demodulator circuit depending upon the bandwidth and the amplitude level desired of the modulated color difference signals. For a general discussion of color difference signal demodulators, see, for example, the article by Pritchard and Rhodes entitled, "Color Television Signal Receiver Demodulators," published in the RCA Review for June 1953.

The demodulators 73 of Figure 2 illustrate the use of one type of high level demodulator circuit which performs the function of a synchronous demodulator in a direct and efficient fashion. The demodulators 73 employ the triodes 81 and 83. The demodulating signal having the phase $\theta$ (B—Y) is applied to the resonant circuit 85, from which circuit the demodulating signal is applied to the control grid of triode 81 by way of the grid leak circuit 87 which includes the condenser 89 and the resistor 91. The grid leak circuit 87, responsive to the synchronous demodulating signal, causes the triode 81 to conduct for a brief and prescribed interval of each cycle of the synchronous demodulating signal. In like fashion, the synchronous demodulating signal having the phase θ (R—Y) is applied to the resonant circuit 93, from which circuit it is applied to the control grid of triode 83 by way of the grid leak circuit 95 which includes the condenser 97 and the resistor 99. The chrominance signal is developed across the transformer 100 which has a pair of secondaries 101 and 103. The chrominance signal, developed across the transformer secondary 103, is developed between the anode of triode 81 and ground so that current flowing to the anode for the interval prescribed by the B—Y phased synchronous demodulating signal will develop the B—Y color difference signal across the output resistor 105 and therefore at the control grid of electron gun *c*.

The transformer secondary 101 develops the chrominance signal between the anode of triode 83 and ground. The triode 83 will pass current only for brief intervals prescribed by the R—Y phased synchronous demodulating signal thereby devoloping an R—Y color difference signal across the output resistor 107 and therefore at the control grid of electron gun *b*. The series resonant traps 109 and 111 are useful for preventing color information in the vicinity of the color subcarrier from being applied to the control grids of electron guns *b* and *c*.

Having described the invention, what is claimed is:

1. In a color television receiver adapted to receive a color television signal including a luminance signal consisting of low and high frequency components of three component colors, color synchronizing bursts and a chrominance signal, said chrominance signal including modulations representative of a plurality of color difference signals, the combination of, a demodulator circuit responsive to said chrominance signal and to said color synchronizing bursts to produce red and blue color difference signals, a color kinescope having a trio of electron guns for controlling the light output of red, green and blue light emitting phosphors situated on a target area, means to apply solely said luminance signal to one of said trio of electron guns to control the green light output from the green light emitting phosphors on said target area, means to combine said luminance and said red color difference signal to form a first combined signal, means to apply said first combined signal to a second of said trio of electron guns to control the light output of said red light emitting phosphors, and means to combine said luminance signal with said blue color difference signal to form a second combined signal, and means to use said second combined signal to control the emission from the third of said trio of electron guns to control the light emission of said blue light emitting phosphors.

2. In a color television receiver adapted to receive a color television signal including a luminance signal consisting of low and high frequency components of three component colors, color synchronizing bursts and a chrominance signal, said chrominance signal including modulations representative of a plurality of color difference signals, the combination of, a color kinescope having a first, second and third electron gun each having a cathode and a control grid, said color kinescope also including a target area including red, blue and green color light emitting phosphors, each of said phosphors controllable by the emission of one of said electron guns, means to amplify said luminance signal, said means including a luminance signal output terminal and a luminance signal reference terminal, means to apply said amplified luminance signal from said signal output terminal to each of the cathodes of said trio of electron guns, a chrominance filter to separate said chrominance signal from said color television signal, means responsive to said color synchronizing bursts to develop a plurality of demodulating signals each having a prescribed and different phase, a demodulator circuit responsive to said chrominance signal and selected synchronous demodulating signals to produce a blue color difference signal and a red color difference signal, means to apply said red color difference signal to the control grid of the electron gun whose emission controls the light output of said red light emitting phosphors, means to apply said blue color difference signal to the control grid of the electron gun whose emission controls the light emission of said blue light emitting phosphors and means coupling said luminance signal reference terminal to the control grid of the electron gun whose emission controls the light emission of the green light emitting phosphors such that signal control of the light emission of the green light emitting phosphors is effected solely in accordance with said luminance signal.

3. In a color television receiver adapted to receive a color television signal containing information relating to the brightness of a televised image and the hue and saturation relating to the component colors of said televised image, said brightness information in said television signal consisting of low and high frequency components of the component colors, the combination of, a color image reproducer having a plurality of light emitting areas producing light at a plurality of different component colors, means to use only the brightness information to control the light emission of said light emitting areas corresponding to a first of said plurality of component colors, means to derive from said color television signal a plurality of component color signals describing the brightness, hue and saturation relating to other component colors, and means to use said plurality of component color signals to control the light emission from said other light emitting areas.

4. In combination, a color image reproducer capable of light emission at each of a plurality of component colors and having a plurality of electron flows for controlling the light output of said color image reproducer at each of said plurality of component colors, means to receive a color television signal including information relating to the brightness of a televised image and to the hue and saturation of each of said plurality of component colors in a televised image, said brightness information in said television signal consisting of low and high frequency components of the component colors, means to derive a first signal from said color television signal representative of only the brightness of the televised image over both a first lower frequency range and a second higher frequency range, means to use only said first signal to control the electron flow controlling the light output of said color image reproducer at a first of said plurality of component colors, means to derive other and different signals from said color television signal each representative of the hue and saturation of a selected one of said plurality of component colors and also said brightness over said first frequency range and of said brightness over said second frequency range, and means to employ said other signals to control electron flows controlling corresponding light output of said color image reproducer.

5. In a color television receiver adapted to receive a color television signal including a luminance signal and a chrominance signal, said luminance signal including modulations representative of low and high frequency components of the component colors, said chrominance signal including modulations representative of a plurality of color difference signals, the combination of, a color image reproducer having a plurality of color light producing areas producing light at different component colors, means to utilize only said luminance signal to control the light output of one of said component color light emitting areas, means deriving a first component color information signal from said luminance signal and said chrominance signal, and means to use said first component color information signal to control the light output of a second color light emitting area having corresponding color light emitting characteristics.

6. In a color television receiver adapted to receive a color television signal including a luminance signal and a chrominance signal, said luminance signal including modulations representative of low and high frequency components of the component colors, said chrominance signal including modulations representative of a plurality of color difference signals, the combination of, a color image reproducer having a plurality of color light emitting areas producing light at different component colors, and a plurality of electron beams to excite each group of said areas having the same color characteristics, means to utilize only said luminance signal to modulate one electron beam to control the light output of one of said component color light emitting areas, means deriving a first component color information signal from said luminance signal and said chrominance signal, and means to use said first component color information signal to modulate a second electron beam to control the light output of a second color light emitting area having corresponding color light emitting characteristics, means to derive a second and different component color information signal from said luminance signal and said chrominance signal, and means to utilize said second component color information signal to modulate a third electron beam to control the color light emission of a color light emitting area having corresponding color light emission characteristics of said color image reproducer.

7. In a color television receiver adapted to receive a color television signal including a luminance signal made up of prescribed proportions of low and high frequency components of color information related to first, second and third colors, color synchronizing bursts, and a chrominance signal, said chrominance signal including modulations representative of a plurality of color information signals, the combination of, a color kinescope having a first, second and third electron gun each having a cathode and a control grid, said color kinescope having a target area including first, second and third color light emitting phosphors, each of said phosphors controllable by the emission of one of said electron guns, means to amplify said luminance signal and to apply said amplified luminance signal to each of the cathodes of said trio of electron guns, means comprising a luminance signal ground connection to the control grid of the electron gun whose emission controls the light emission of said first light emitting phosphors for restricting signal control of the light emission of said first light emitting phosphors to control in accordance with only said luminance signal a chrominance filter to separate said chrominance signal from said color television signal, means responsive to said color synchronizing bursts to develop a plurality of demodulating signals each having a prescribed and different phase, a demodulator circuit responsive to said chrominance signal and selected synchronous demodulating signals to produce color information signals corresponding to a second and third color, means to apply said color information signal corresponding to said second color to the control grid of the electron gun whose emission controls the light output of said second color emitting phosphors, and means to apply said color information signal corresponding to said third color to the control grid of the electron gun whose emission controls the light emission of said third color light emitting phosphors.

8. In a color television receiver adapted to receive a color television signal containing information relating to the luminance of a televised image and the hue and saturation relating to the component colors of said televised image, said luminance information in said television signal consisting of low and high frequency components of the component colors, the combination of, a color image reproducer having a plurality of light emitting areas producing light at different component colors, said different component colors including at least a first and second component color, means to use only the luminance information to control the light emission of said light emitting areas corresponding to said first of said plurality of corresponding component colors, means to derive from said color television signal at least a second component color signal describing the luminance, hue and saturation relating to a second component color, and means to use said second component color signal to control the light emission from said light emitting areas corresponding to said second component color of said color image reproducer.

References Cited in the file of this patent

UNITED STATES PATENTS

| | | |
|---|---|---|
| 2,675,422 | Bedford | Apr. 13, 1954 |
| 2,732,425 | Pritchard | Jan. 24, 1956 |
| 2,825,753 | Hausz | Mar. 4, 1958 |

FOREIGN PATENTS

| | | |
|---|---|---|
| 509,966 | Belgium | Mar. 31, 1952 |